US010255704B2

United States Patent
Gingawa et al.

(10) Patent No.: US 10,255,704 B2
(45) Date of Patent: Apr. 9, 2019

(54) VIDEO DELIVERY TERMINAL, NON-TRANSITORY COMPUTER-READABLE MEDIUM, AND VIDEO DELIVERY METHOD

(71) Applicants: Nobumasa Gingawa, Kanagawa (JP); Hiroaki Uchiyama, Kanagawa (JP); Koji Kuwata, Kanagawa (JP); Masato Takahashi, Tokyo (JP); Kiyoto Igarashi, Kanagawa (JP); Tomoyuki Goto, Kanagawa (JP); Kazuki Kitazawa, Kanagawa (JP)

(72) Inventors: Nobumasa Gingawa, Kanagawa (JP); Hiroaki Uchiyama, Kanagawa (JP); Koji Kuwata, Kanagawa (JP); Masato Takahashi, Tokyo (JP); Kiyoto Igarashi, Kanagawa (JP); Tomoyuki Goto, Kanagawa (JP); Kazuki Kitazawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 27 days.

(21) Appl. No.: 15/217,260

(22) Filed: Jul. 22, 2016

(65) Prior Publication Data
US 2017/0032555 A1    Feb. 2, 2017

(30) Foreign Application Priority Data
Jul. 27, 2015    (JP) .................. 2015-148077

(51) Int. Cl.
| H04N 5/235 | (2006.01) |
| G06T 11/60 | (2006.01) |
| H04N 7/14 | (2006.01) |
| H04N 9/73 | (2006.01) |

(52) U.S. Cl.
CPC .......... *G06T 11/60* (2013.01); *H04N 5/2355* (2013.01); *H04N 7/147* (2013.01); *H04N 9/735* (2013.01)

(58) Field of Classification Search
CPC .... G06T 11/60; G06K 9/00228; H04N 7/147; H04N 5/23219; H04N 5/232; H04N 3/155; H04N 9/735; H04N 5/2355
See application file for complete search history.

(56) References Cited

U.S. PATENT DOCUMENTS

| 5,959,667 | A | 9/1999 | Maeng |
| 6,618,073 | B1 | 9/2003 | Lambert et al. |
| 7,113,201 | B1 | 9/2006 | Taylor et al. |
| 7,117,157 | B1 | 10/2006 | Taylor et al. |
| 9,684,987 | B1* | 6/2017 | Dhua ..................... G06T 11/60 |
| 2006/0187306 | A1 | 8/2006 | Matsui |

(Continued)

FOREIGN PATENT DOCUMENTS

| JP | 2004-007283 | 1/2004 |
| JP | 2006-222816 | 8/2006 |

*Primary Examiner* — Hung H Lam
(74) *Attorney, Agent, or Firm* — Oblon, McClelland, Maier & Neustadt, L.L.P.

(57) ABSTRACT

A video delivery terminal includes: an image capturer configured to perform image capture to generate an image of a subject; and a developing processor configured to crop an area of a portion of the image to generate a cropped image, perform first adjustment regarding the cropped image based on characteristics of the cropped image, and perform second adjustment regarding settings of the image based on characteristics of the image having undergone the first adjustment.

10 Claims, 7 Drawing Sheets

(56) References Cited

U.S. PATENT DOCUMENTS

| | | |
|---|---|---|
| 2007/0040903 A1 | 2/2007 | Kawaguchi |
| 2007/0279492 A1* | 12/2007 | Ohnishi ............... G01S 3/7864 |
| | | 348/143 |
| 2008/0013799 A1* | 1/2008 | Steinberg ........... G06K 9/00228 |
| | | 382/118 |
| 2008/0246833 A1 | 10/2008 | Yasui et al. |
| 2009/0002477 A1 | 1/2009 | Cutler |
| 2009/0046139 A1 | 2/2009 | Cutler et al. |
| 2009/0147942 A1 | 6/2009 | Culter |
| 2009/0316016 A1* | 12/2009 | Iwamoto ............ H04N 5/23219 |
| | | 348/222.1 |
| 2010/0039497 A1 | 2/2010 | Cutler |
| 2010/0123770 A1 | 5/2010 | Friel et al. |
| 2011/0285807 A1 | 11/2011 | Feng |
| 2011/0285808 A1 | 11/2011 | Feng et al. |
| 2011/0285809 A1 | 11/2011 | Feng et al. |
| 2011/0310267 A1* | 12/2011 | Ichiyama ............... H04N 5/232 |
| | | 348/222.1 |
| 2011/0313766 A1 | 12/2011 | Zhang et al. |
| 2012/0278077 A1 | 11/2012 | Zhang et al. |
| 2012/0307048 A1 | 12/2012 | Abrahamsson et al. |
| 2012/0320143 A1 | 12/2012 | Chu et al. |
| 2013/0271559 A1 | 10/2013 | Feng et al. |
| 2014/0376740 A1 | 12/2014 | Shigenaga et al. |
| 2015/0023524 A1 | 1/2015 | Shigenaga et al. |
| 2015/0046581 A1 | 2/2015 | Inoue |
| 2015/0047002 A1 | 2/2015 | Tamura |
| 2015/0071130 A1 | 3/2015 | Okuyama |
| 2015/0111566 A1 | 4/2015 | Nakamura |
| 2015/0133106 A1 | 5/2015 | Nakamura |
| 2015/0146078 A1 | 5/2015 | Aarrestad et al. |
| 2015/0149909 A1 | 5/2015 | Nakamura et al. |
| 2015/0149990 A1 | 5/2015 | Nakamura |
| 2017/0094157 A1* | 3/2017 | Shinozaki .......... H04N 5/23216 |
| 2017/0372108 A1* | 12/2017 | Corcoran ........... G06K 9/00228 |

* cited by examiner

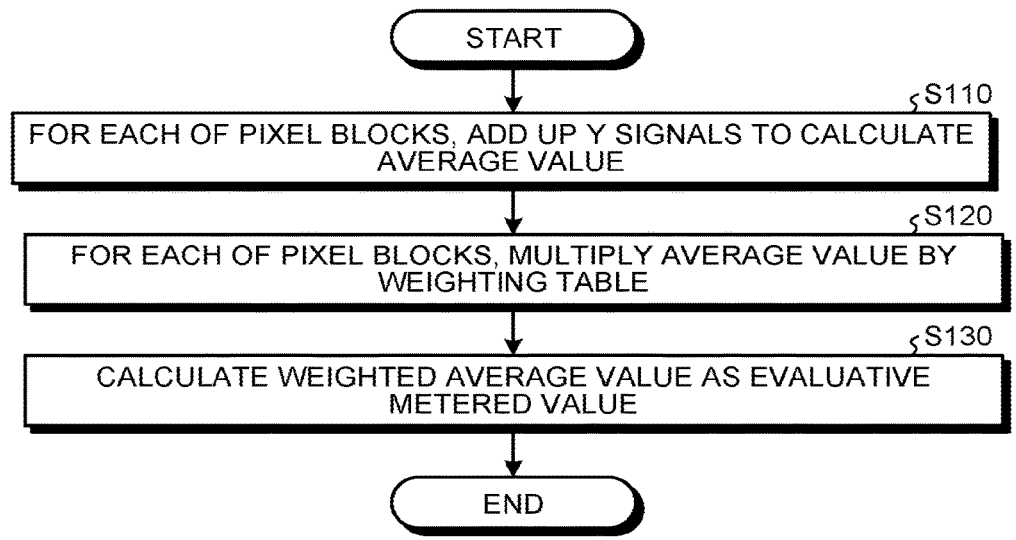
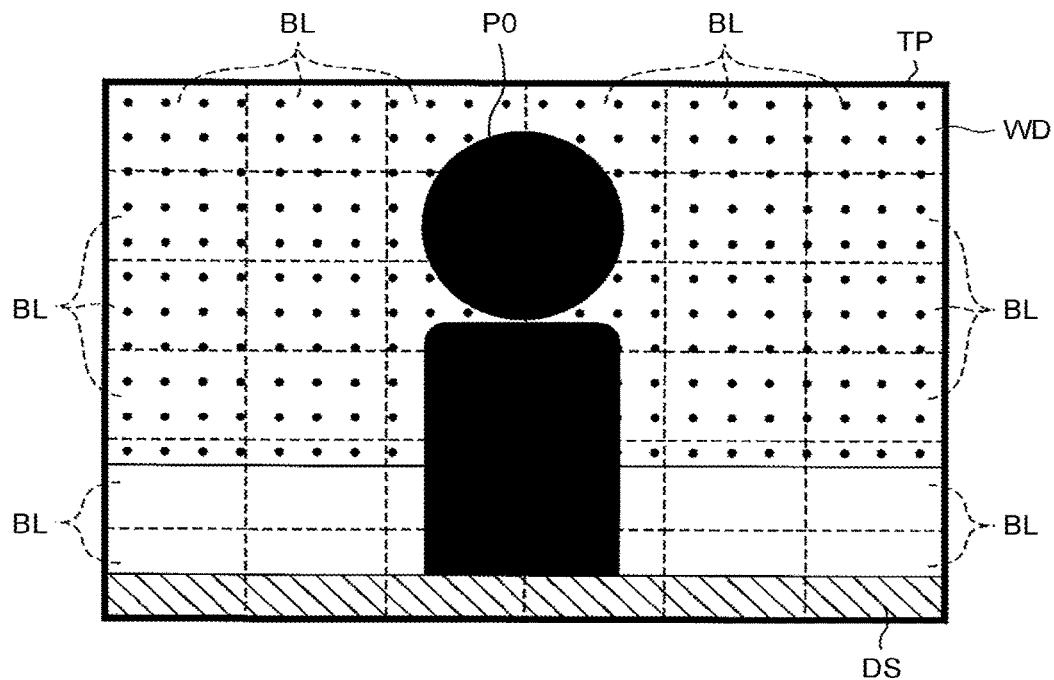

VIDEO DELIVERY TERMINAL, NON-TRANSITORY COMPUTER-READABLE MEDIUM, AND VIDEO DELIVERY METHOD

CROSS-REFERENCE TO RELATED APPLICATIONS

The present application claims priority under 35 U.S.C. § 119 to Japanese Patent Application No. 2015-148077, filed Jul. 27, 2015. The contents of which are incorporated herein by reference in their entirety.

BACKGROUND OF THE INVENTION

1. Field of the Invention

The present invention relates generally to a video delivery terminal, a non-transitory computer-readable medium, and a video delivery method.

2. Description of the Related Art

Video delivery systems, such as video conferencing systems, in which each of remote sites displays an image(s) of the other site(s) by transferring images between the remote sites, are known. Some type of such video delivery systems displays a cropped image, which is an image cropped from a wide-angle image taken with a wide-angle camera of a video delivery terminal. An example of a video delivery system of this type is disclosed in Japanese Unexamined Patent Application Publication No. 2006-222816 (Patent Document 1).

However, such a video delivery system has a problem that, because settings for exposure and the like of a cropped image cropped from a wide-angle image are set with reference to settings for exposure and the like of the other areas of the wide-angle image, the settings can be inappropriate.

SUMMARY OF THE INVENTION

According to an aspect of the present invention, there is provided a video delivery terminal including: an image capturer configured to perform image capture to generate an image of a subject; and a developing processor configured to crop an area of a portion of the image to generate a cropped image, perform first adjustment regarding the cropped image based on characteristics of the cropped image, and perform second adjustment regarding settings of the image based on characteristics of the image having undergone the first adjustment.

According to another aspect of the present invention, there is provided a non-transitory computer-readable medium including computer readable program codes, performed by a processor, the program codes when executed causing the processor to execute: performing image capture to generate an image of a subject; cropping an area of a portion of the image to generate a cropped image; performing first adjustment regarding the cropped image based on characteristics of the cropped image; and performing second adjustment regarding settings of the image based on characteristics of the image having undergone the first adjustment.

According to still another aspect of the present invention, there is provided a video delivery method including: performing image capture to generate an image of a subject; cropping an area of a portion of the image to generate a cropped image; performing first adjustment regarding the cropped image based on characteristics of the cropped image; and performing second adjustment regarding settings of the image based on characteristics of the image having undergone the first adjustment.

BRIEF DESCRIPTION OF THE DRAWINGS

FIG. 4 is a flowchart of a process for calculating an evaluative metered value of a cropped image of a speaker;

FIG. 5 is a diagram describing a cropped image of a speaker;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
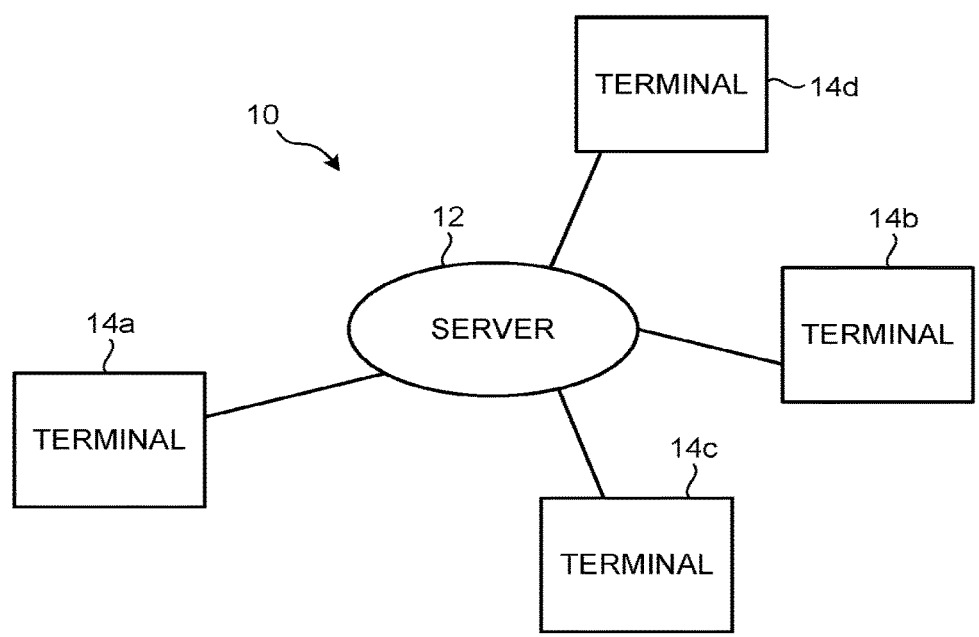
FIG. 1 is a schematic overall diagram of a video delivery system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The present invention has an object to provide a video delivery terminal, a non-transitory computer-readable medium, and a video delivery method capable of displaying a cropped image with appropriate settings.

The following exemplary embodiments and modifications may include like elements. In the following, like reference numerals denote like elements, and repeated description may be partially omitted. A portion included in one of the embodiments and modifications can be replaced with a corresponding portion in another one of the embodiments and modifications. Configurations, positions, and the like of portions included in the embodiments and modifications are similar to those of the other embodiments and modifications unless otherwise specifically stated.

Embodiment

FIG. 1 is a schematic overall diagram of a video delivery system 10 according to an embodiment. The video delivery system 10 according to the embodiment is applied to a video conferencing system that allows users at a plurality of remote sites to have a conference while viewing images of the other user(s). As illustrated in FIG. 1, the video delivery system 10 includes a server 12 and a plurality of terminals 14, each of which is an example of "video delivery terminal". In the following, if it is unnecessary to individually differentiate the terminals 14a, 14b, 14c, and 14d, the terminals are denoted by a reference numeral "14". Each of the video delivery terminals may be either a dedicated video delivery terminal or an information processing terminal, such as a personal computer, a smartphone, and a tablet computer.

The server 12 is coupled to each of the terminals 14 via a network, such as the Internet. The server 12 monitors whether or not each of the terminals 14 is in a state coupled to the server 12; furthermore, the server 12 performs control for calling up the terminals 14 at start of a conference and a variety of control during the conference.

The terminal 14 transmits and receives data to and from the other terminals 14 via the server 12. For example, the terminal 14 transmits image data and voice data captured by the terminal 14 to the server 12. The terminal 14 also receives, from the server 12, image data and voice data transmitted by another one of the terminals 14. The terminal 14 displays an image from the image data acquired from the other one of the terminals 14 and outputs voice from the voice data.

For example, in a situation where the terminals 14a, 14b, and 14c participate in a conference but the terminal 14d does not participate in the conference, data transmitted from the terminal 14a is delivered to the terminals 14b and 14c via the server 12 but not to the terminal 14d. Data transmitted from the terminals 14b, 14c is delivered to the terminal 14a via the server 12 but not to the terminal 14d. The video delivery system 10 thus implements video conferencing with the plurality of terminals 14.

Figure 2:
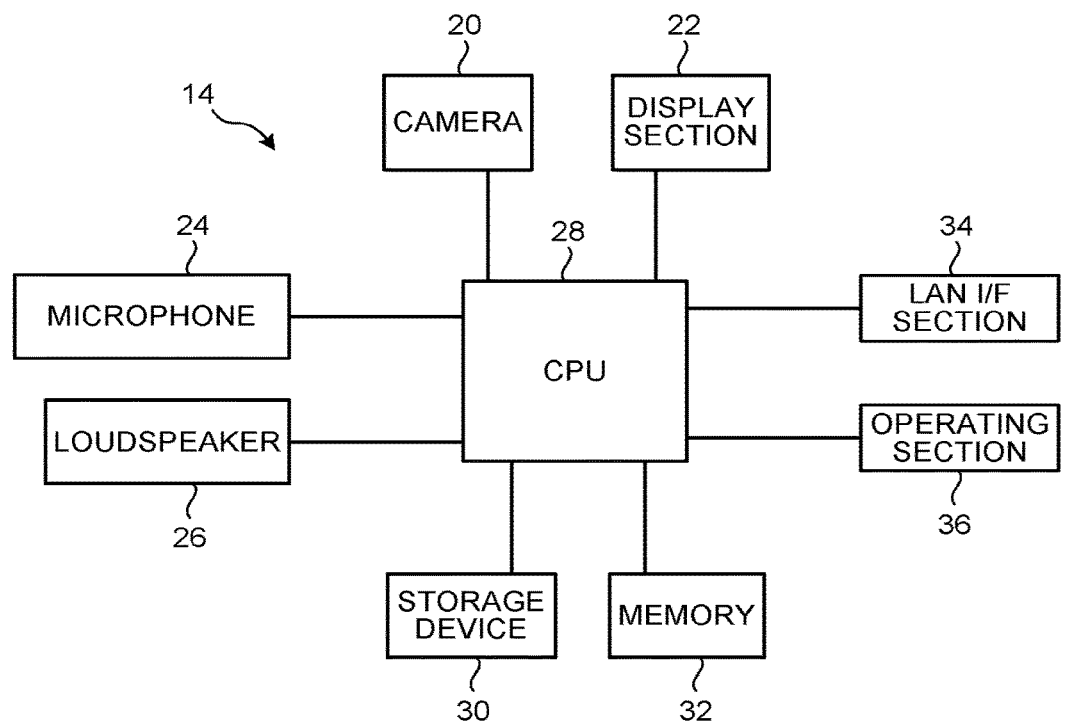
FIG. 2 is a block diagram describing a control system of a terminal.

FIG. 2 is a block diagram describing a control system of the terminal 14. As illustrated in FIG. 2, the terminal 14 includes a camera 20, which is an example of "image capturer", a display section 22, a microphone 24, a loudspeaker 26, a CPU (Central Processing Unit) 28, a storage device 30, a memory 32, a LAN (Local Area Network) interface section 34, and an operating section 36.

The camera 20 generates image data representing a captured image of a subject, such as a participant of a conference. The camera 20 is configured to be capable of capturing an image of a wide-angle (e.g., 360 degrees) area. For example, when configured to capture an image of an ultra-wide angle of 360 degrees, the camera 20 includes a plurality of image sensors and lenses, which respectively correspond to the image sensors. The camera 20 outputs the generated image data representing the wide-angle image to the CPU 28.

The display section 22 is, for example, a display device, such as a liquid crystal display or an organic electroluminescent (EL) display. The display section 22 displays an image from the image data acquired from the CPU 28. For example, the display section 22 displays an image of a conference participant near another one of the terminals 14 from image data acquired by the CPU 28 from the other one of the terminals 14.

The microphone 24 is a microphone array, for example. The microphone 24 converts captured voice into electrical voice data and outputs the voice data to the CPU 28. The microphone 24 captures voice of a conference participant, for example.

The loudspeaker 26 outputs voice from voice data acquired from the CPU 28. The loudspeaker 26 outputs voice of a conference participant captured by the microphone 24 of another one of the terminals 14, for example.

The CPU 28 performs centralized control of the terminal 14. The CPU 28 performs, for example, video-conference-related control including transmission and reception of image data and voice data in a video conference.

The storage device 30 is a storage device, such as an HDD (Hard Disk Drive) and a non-volatile flash memory. The storage device 30 is configured such that the CPU 28 can read and write program instruction and data from and to the storage device 30. Specifically, the storage unit 30 stores program instructions to be executed by the CPU 28 and data necessary for executing the program instructions. The storage unit 30 stores, for example, program instructions for video conferencing and image data necessary for executing the program instructions for the video conferencing.

The memory 32 is a RAM (Random Access Memory), for example. The memory 32 is configured such that the CPU 28 can read and write program instruction and data from and to the memory 32. The memory 32 temporarily stores program instructions loaded therein for execution by the CPU 28 and data, such as operations data.

The LAN interface section 34 is, for example, a wired LAN device that is coupled to Ethernet (registered trademark) compliant with 10Base-T, 100Base-TX, and 1000Base-T standards, or a wireless LAN device compliant with 802.11a/b/g/n standards. The LAN interface section 34 is coupled to the other terminals 14 via a network, the server 12, and the like in a manner that allows data transmission and reception. Hence, the LAN interface section 34 transmits and receives image data, voice data, and the like necessary for video conferencing to and from the other terminals 14 and outputs them to the CPU 28.

The operating section 36 is an input device, such as a keyboard, a mouse, and a button, for example. The operating section 36 acquires an instruction and the like entered by a user, e.g., a conference participant, for device control and outputs the instruction to the CPU 28.

In the terminal 14 during a video conference, when the CPU 28 acquires voice data representing voice of a conference participant from the microphone 24, the CPU 28 detects a direction, in which a speaker, i.e., the speaking participant, is positioned, from the voice data. The CPU 28 identifies the speaker of the voice data from a plurality of participants contained in a wide-angle image represented by image data acquired from the camera 20. The CPU 28 generates image data representing a cropped close-up image of the identified speaker. The CPU 28 corrects the wide-angle image containing the plurality of participants and the cropped image of the speaker as necessary.

The CPU 28 transmits the image data representing the wide-angle image containing the plurality of participants, the image data representing the cropped close-up image of the speaker, voice data of the participants including the speaker, and the like to the server 12 via the LAN interface section 34 and the network.

The CPU 28 receives, from the server 12, image data and voice data transmitted from another one of the terminals 14 via the LAN interface section 34 and the network. The CPU 28 outputs the received image data to the display section 22 and causes the display section 22 to display participants and a speaker. Furthermore, the CPU 28 outputs the voice data to the loudspeaker 26 and causes the loudspeaker 26 to reproduce voice of the speaker. The terminals 14 perform video conferencing in this way.

Figure 3:
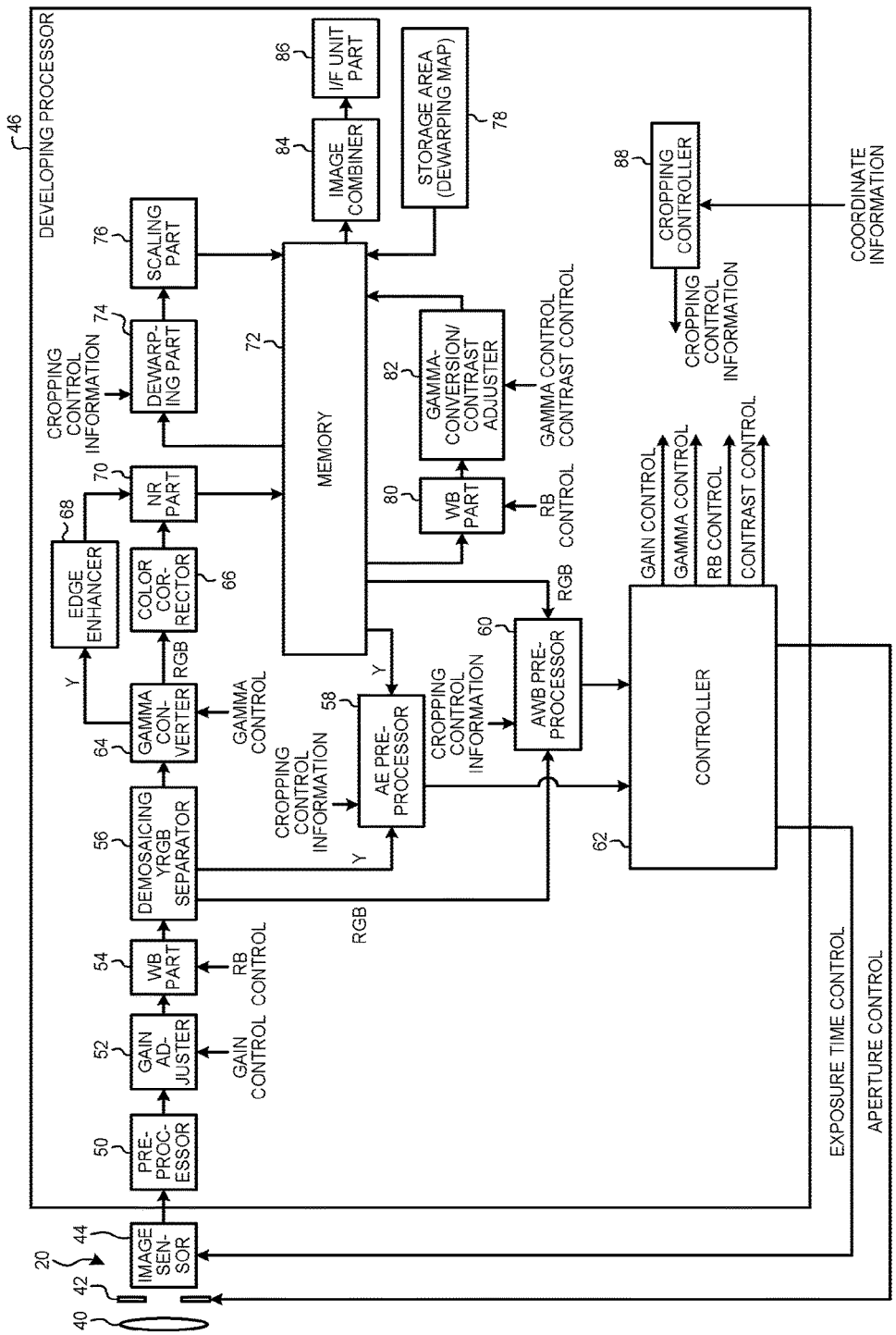
FIG. 3 is a block diagram describing a camera and image data processing in the terminal.

FIG. 3 is a block diagram describing the camera 20 and image data processing in the terminal 14. As illustrated in FIG. 3, the camera 20 of the terminal 14 includes a lens 40, an aperture 42, and an image sensor 44. The terminal 14 further includes a developing processor 46. For example, the CPU 28 having loaded program instructions thereon may function as the developing processor 46.

The image sensor 44 is, for example, a CMOS (Complementary Metal Oxide Semiconductor) image sensor or a CCD (Charge-Coupled Device) image sensor. The image sensor 44 receives light condensed by the lens 40 and passed through the aperture 42, by which the amount of light is adjusted. The image sensor 44 performs photoelectric conversion to convert the received light into an electrical signal. The image sensor 44 generates a raw signal by reading out and amplifying the electrical signal and performing A/D conversion on the electrical signal. The image sensor 44 outputs image data of the raw signal to the developing processor 46. For example, the image sensor 44 outputs image data representing a wide-angle image containing plurality of conference participants to the developing processor 46.

The developing processor 46 generates a cropped image by cropping a part of an image, such as a wide-angle image. The developing processor 46 performs first adjustment regarding the cropped image based on characteristics of the cropped image. For example, the developing processor 46 generates a cropped image by cropping an area of and surrounding a speaker (hereinafter, "speaker's area") contained in a wide-angle image. An example of the characteristics of the cropped image is an evaluative metered value of the cropped image, which will be described later. Examples of the first adjustment include adjustment, or automatic adjustment, of exposure time of the camera 20, adjustment, or automatic adjustment, of the aperture 42 of the camera 20, gain adjustment or automatic gain adjustment, contrast adjustment or automatic contrast adjustment, adjustment, or automatic adjustment, of gamma correction, and white balance adjustment or automatic white balance adjustment. The developing processor 46 performs second adjustment regarding image settings based on characteristics of the image, such as the wide-angle image, having undergone the first adjustment. An example of the characteristics of the wide-angle image is an evaluative metered value of the image, such as the wide-angle image, which will be described later. Examples of the second adjustment include contrast adjustment or automatic contrast adjustment, adjustment, or automatic adjustment, of gamma correction, gain adjustment or automatic gain adjustment, and white balance adjustment or automatic white balance adjustment. The second adjustment is performed on settings different from settings of the first adjustment.

The developing processor 46 includes a preprocessor 50, a gain adjuster 52, a white balance (WB) part 54, a demosaicing YRGB separator 56, an automatic exposure (AE) preprocessor 58, an automatic white balance (AWB) preprocessor 60, a controller 62, a gamma converter 64, a color corrector 66, an edge enhancer 68, a noise reduction (NR) part 70, a memory 72, a dewarping part 74, a scaling part 76, a storage area 78, a WB part 80, a gamma-conversion/contrast adjuster 82, an image combiner 84, an interface (I/F) unit part 86, and a cropping controller 88.

The preprocessor 50 acquires image data of a raw signal from the image sensor 44 of the camera 20. The preprocessor 50 performs preprocessing, such as clamping, missing pixel correction, and lens shading correction, on the image data. The preprocessor 50 outputs the preprocessed image data to the gain adjuster 52.

The gain adjuster 52 adjusts brightness of the image data acquired from the preprocessor 50 by adjusting gain of the image data. The gain adjuster 52 outputs the gain-adjusted image data to the WB part 54.

The WB part 54 adjusts white balance of the image data acquired from the gain adjuster 52 by amplifying an R (Red) signal and a B (Blue) signal of the image data. The WB part 54 outputs the white-balanced image data to the demosaicing YRGB separator 56.

The demosaicing YRGB separator 56 applies demosaicing (interpolation) to the image data acquired from the WB part 54, thereby allocating R, G (Green), and B signals on a pixel-by-pixel basis. The demosaicing YRGB separator 56 calculates Y signals, which are luminance values, from the allocated RGB signals. The demosaicing YRGB separator 56 outputs the Y signals to the AE preprocessor 58. The demosaicing YRGB separator 56 outputs the RGB signals to the AWB preprocessor 60. The demosaicing YRGB separator 56 outputs the RGB signals and the Y signals to the gamma converter 64.

The AE preprocessor 58 acquires cropping control information, which is information about the cropped image of the speaker's area cropped from the wide-angle image, from the cropping controller 88. The AE preprocessor 58 selects the speaker's area from the image data based on the cropping control information and performs AE metering. The AE preprocessor 58 calculates an AE evaluative metered value of the cropped speaker's area from a result of the metering and outputs the AE evaluative metered value to the controller 62.

The AWB preprocessor 60 acquires the cropping control information from the cropping controller 88. The AWB preprocessor 60 selects the speaker's area from the image data based on the cropping control information and performs AWB metering. The AWB preprocessor 60 calculates an AWB evaluative metered value of the cropped speaker's area based on a result of the metering and outputs the AWB evaluative metered value to the controller 62.

The controller 62 generates an exposure-time control signal, an aperture control signal, a gain control signal, an RB control signal, a gamma control signal, and a contrast control signal based on the AE evaluative metered value acquired from the AE preprocessor 58 and the AWB evaluative metered value acquired from the AWB preprocessor 60. The controller 62 performs the first adjustment by feeding back the generated exposure-time control signal to the image sensor 44. The controller 62 feeds back the generated aperture control signal to the aperture 42. The controller 62 feeds back the generated gain control signal to the gain adjuster 52. The controller 62 feeds back the generated RB control signal to the WB part 54. The controller 62 feeds back the generated gamma control signal to the gamma converter 64. In response to the signals, the image sensor 44, the aperture 42, the gain adjuster 52, the WB part 54, and the gamma converter 64 adjust brightness of the image data representing the wide-angle image so that the specified and cropped speaker's area achieves favorable brightness.

The gamma converter 64 performs gamma conversion of the RGB signals acquired from the demosaicing YRGB separator 56 based on the gamma control signal acquired from the controller 62, and outputs the converted RGB signals to the color corrector 66. The gamma converter 64 performs gamma conversion of the Y signals acquired from the demosaicing YRGB separator 56 based on the gamma control signal acquired from the controller 62, and outputs the converted Y signals to the edge enhancer 68.

The color corrector 66 adjusts hue, saturation, and the like of the image data based on the RGB signals acquired from the gamma converter 64 and, furthermore, corrects the image data based on spectral distribution characteristics of an infrared blocking filter. The color corrector 66 outputs the corrected image data to the NR part 70.

The edge enhancer 68 performs processing of enhancing edges of the speaker based on the Y signals, which are the luminance values, acquired from the gamma converter 64. The edge enhancer 68 outputs the processed image data to the NR part 70.

The NR part 70 reduces noises of the Y signals acquired from the edge enhancer 68 and the RGB signals acquired from the color corrector 66. The NR part 70 writes the noise-reduced image data to the memory 72.

The dewarping part 74 acquires the cropping control information from the cropping controller 88. The dewarping part 74 reads out the image data representing the cropped image of the speaker from the memory 72. The dewarping part 74 performs dewarping on the read-out image data representing the cropped image based on a dewarping map stored in the storage area 78. The dewarping part 74 outputs the corrected image data representing the cropped image to the scaling part 76.

The scaling part 76 performing an enlarging/reducing process on the image data representing the cropped image acquired from the dewarping part 74. The scaling part 76 writes the image data representing the enlarged/reduced cropped image to the memory 72.

The AE preprocessor 58 reads out the Y signals of the image data representing the wide-angle image having undergone the first adjustment from the memory 72. The AE preprocessor 58 calculates an AE evaluative metered value by performing AE metering on the read-out Y signals.

The AWB preprocessor 60 reads out the RGB signals of the image data representing the wide-angle image having undergone the first adjustment from the memory 72. The AWB preprocessor 60 calculates an AWB evaluative metered value by performing AWB metering on the read-out RGB signals.

The controller 62 generates an RB control signal, a gain control signal, a gamma control signal, a contrast control signal, and the like based on the AE evaluative metered value and the AWB evaluative metered value of the image data representing the wide-angle image and performs the second adjustment. The controller 62 outputs the RB control signal to the WB part 80. The controller 62 outputs the gamma control signal and the contrast control signal to the gamma-conversion/contrast adjuster 82.

The WB part 80 reads out the image data representing the wide-angle image from the memory 72. The WB part 80 adjusts white balance of the image data representing the wide-angle image based on the RB control signal acquired from the controller 62. The WB part 80 outputs the white-balanced image data representing the wide-angle image to the gamma-conversion/contrast adjuster 82.

The gamma-conversion/contrast adjuster 82 performs, on the image data representing the wide-angle image acquired from the WB part 80, gamma conversion and contrast adjustment based on the gamma control signal and the contrast control signal acquired from the controller 62. The gamma-conversion/contrast adjuster 82 writes the image data representing the wide-angle image having undergone the gamma conversion and contrast adjustment to the memory 72.

The dewarping part 74 reads out the image data representing the wide-angle image written by the gamma-conversion/contrast adjuster 82 from the memory 72. The dewarping part 74 performs dewarping on the read-out image data representing the wide-angle image based on the dewarping map, and thereafter outputs the dewarped image data to the scaling part 76.

The scaling part 76 performs an enlarging/reducing process on the image data representing the wide-angle image acquired from the dewarping part 74, and thereafter writes the enlarged/reduced image data to the memory 72.

The image combiner 84 reads out the image data representing the cropped image and the image data representing the wide-angle image, each respectively having undergone the above-described image processing and thereafter written to the memory 72. The image combiner 84 generates combined image data representing a single image, into which the image data representing the cropped image and the image data representing the wide-angle image are combined, and outputs the combined image data to the I/F unit part 86.

The I/F unit part 86 converts the combined image data into serial image data (compliant with, e.g., the V-by-One (registered trademark) HS standard or the HDMI (registered trademark) standard), and thereafter transmits the serial image data to the server 12.

Because the developing processor 46 performs the first adjustment so that the cropped image achieves favorable brightness and thereafter performs the second adjustment on the wide-angle image in this way, adjusting the cropped image of the speaker to appropriate brightness while adjusting the wide-angle image to appropriate brightness can be achieved.

FIG. 4 is a flowchart of a process for calculating an evaluative metered value of a cropped image of a speaker. The evaluative metered value calculated in the flowchart corresponds to both the AE evaluative metered value and the AWB evaluative metered value.

As illustrated in FIG. 4, in the process for calculating the evaluative metered value of the cropped image, for each of pixel blocks of the cropped image of the speaker, the developing processor 46 adds up Y signals, which are the luminance values, to calculate an average value of the Y signals (S110).

FIG. 5 is a diagram describing a cropped image TP of a speaker. The cropped image TP is generated by detecting a direction, in which a speaker P0 is positioned, in a wide-angle image and cropping a part corresponding to this direction from the wide-angle image. Referring to the cropped image TP, the speaker P0 at the center is in front of a window WD indicated as a dot-hatched area. A desk DS indicated as a diagonally-hatched area is arranged in front of the speaker P0. The cropped image TP is backlit against the window WD, from which extraneous light is coming. For this reason, the cropped image TP is such that although the window WD is bright, the speaker P0 is too dark and details of the speaker P0 are not obvious. Taking this into account, a metering method that places importance on the speaker P0 is used in the present embodiment. Examples of the metering method usable in the present embodiment include center-weighted metering that meters an image by placing importance on a center portion of the image and spot metering that meters an image by placing importance on a specific part of the image. The present embodiment is described through an example of the center-weighted metering.

The cropped image TP is divided into 6×6 pixel blocks BL. In FIG. 5, each of the pixel blocks BL is surrounded with dashed lines. The pixel block BL contains, for example, 100×100 pixels. The developing processor 46 calculates average values of Y signals of the cropped image TP by calculating a total of Y signals of all the pixels contained in the pixel block BL and dividing the total by the number of pixels in the pixel block BL.

Figure 6:
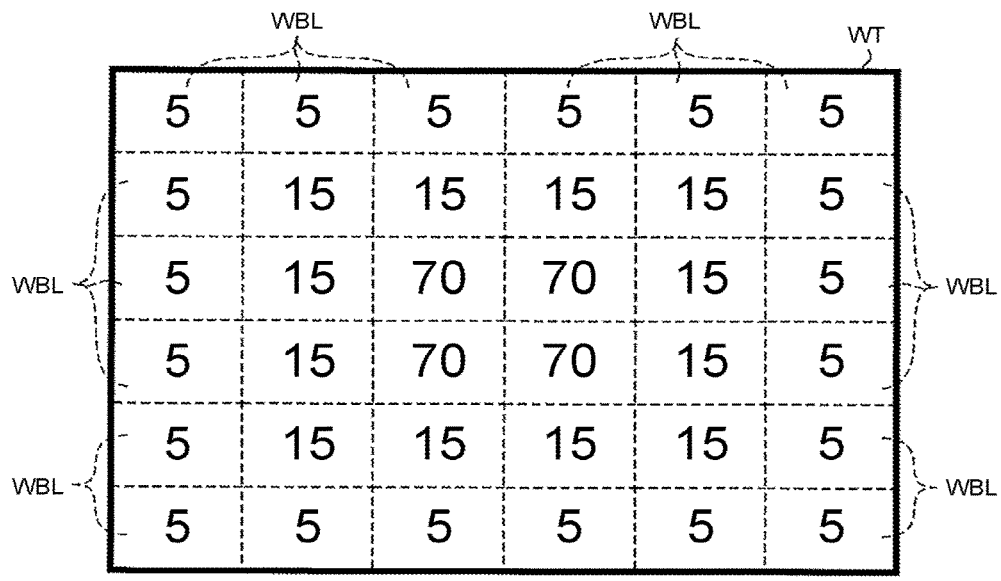
FIG. 6 is a diagram describing a weighting table for assigning weights to Y signals of the cropped image.

Referring back to FIG. 4, the developing processor 46 multiplies the calculated average value of the Y signals by a weighting table WT for each of the pixel blocks BL (S120). FIG. 6 is a diagram describing the weighting table WT for assigning weights to the Y signals of the cropped image TP. The weighting table WT has weighting blocks WBL, into which the weighting table WT is divided as the cropped image TP is divided into the pixel blocks BL. Accordingly, in the present embodiment, the weighting block WBL is divided into 6×6. Weighting coefficients are assigned to the weighting blocks WBL. Because center weighted metering is used in the present embodiment, large weighting coefficients are assigned to the weighting blocks WBL at a center portion. The developing processor 46 multiplies the average value of each of the pixel blocks BL by a weighting coefficient assigned to one, which corresponds to the pixel block BL, of the weighting blocks WBL.

Referring back to FIG. 4, the developing processor 46 calculates a weighted average value of the average values of the Y signals as an evaluative metered value of the cropped image TP (S130). Specifically, the developing processor 46 divides a total value of all the average values, each multiplied by the corresponding weighting coefficient at S120, of the Y signals by a total value of all the weighting coefficients, thereby calculating the weighted average value as the evaluative metered value of the cropped image TP. The evaluative metered value of the cropped image TP is an example of the characteristics of the cropped image TP. Here, the process for calculating the evaluative metered value performed by the developing processor 46 is completed.

Figure 7:
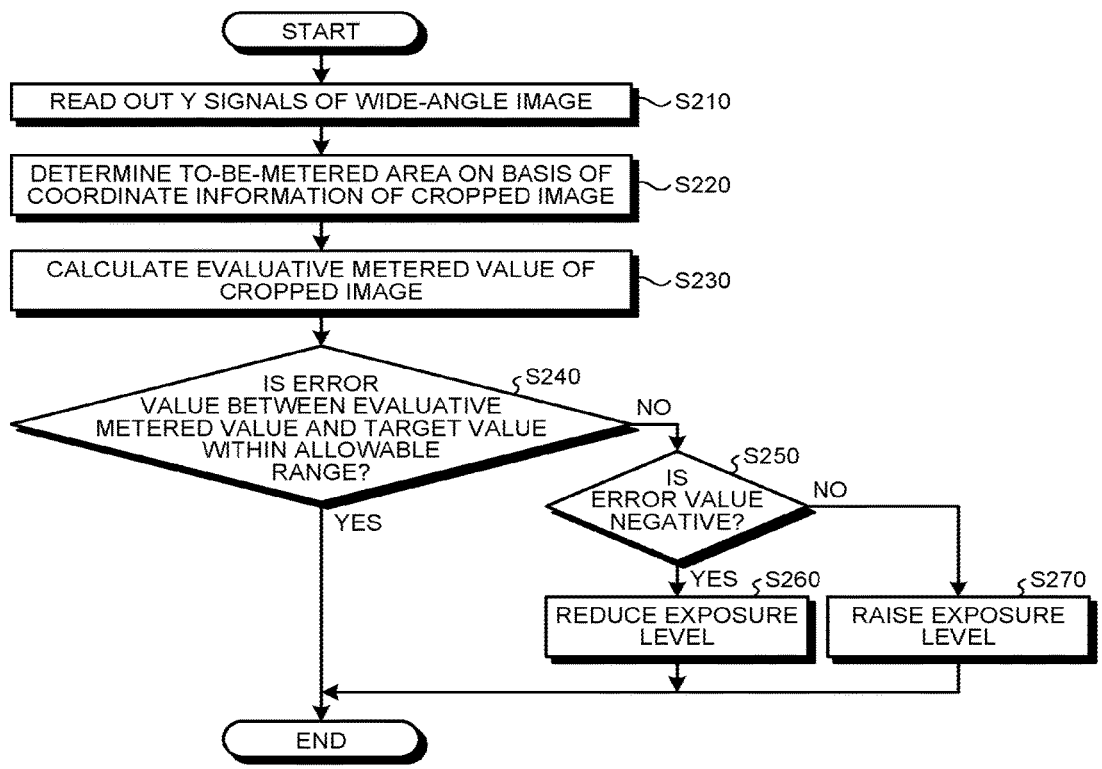
FIG. 7 is a flowchart of an exposure control process performed on the cropped image of the speaker based on an evaluative metered value of the cropped image.

FIG. 7 is a flowchart of an exposure control process performed on the cropped image TP of the speaker based on the evaluative metered value of the cropped image TP.

As illustrated in FIG. 7, in the exposure control process, the developing processor 46 reads out the Y signals of the wide-angle image from the memory 72 (S210). The developing processor 46 determines a to-be-metered area based on coordinate information of the cropped image TP (S220). The to-be-metered area is such an area as that illustrated FIG. 5 where the cropped image TP is cropped in the wide-angle image. The developing processor 46 calculates an evaluative metered value of the cropped image TP in accordance with the above-described process for calculating the evaluative metered value of the cropped image TP (S230).

The developing processor 46 calculates an error value, which is the difference between the evaluative metered value of the cropped image TP and a predetermined target value, by making comparison between the evaluative metered value and the target value. As the target value, for example, an evaluative metered value at an optimum exposure level may be applied. The developing processor 46 determines whether or not the error value is within a predetermined allowable range (S240). In other words, the developing processor 46 determines whether or not exposure of the cropped image TP is within an appropriate range. For example, the developing processor 46 may determine whether or not the error value is within the allowable range by comparing the error value against a predetermined threshold value.

If it is determined that the error value is within the allowable range (Yes at S240), the exposure control process for the cropped image TP performed by the developing processor 46 is completed. Thereafter, the developing processor 46 may iterate the exposure control process for the cropped image TP.

If it is determined that the error value is not within the allowable range (No at S240), the developing processor 46 determines whether or not the error value is negative (S250). In other words, the developing processor 46 determines whether or not the cropped image TP is in underexposure or overexposure.

If it is determined that the error value is negative (Yes at S250), because it is indicated the cropped image TP is in overexposure, the developing processor 46 reduces an exposure level (S260). For example, the developing processor 46 reduces the exposure level by outputting a control signal for reducing the gain, a control signal for reducing the exposure time, and a control signal for narrowing the aperture 42 in order. S260 is an example of the first adjustment. Thereafter, the developing processor 46 may iterate the exposure control process for the cropped image TP.

If it is determined that the error value is not negative (No at S250), because it is indicated that the cropped image TP is in underexposure, the developing processor 46 raises the exposure level (S270). For example, the developing processor 46 raises the exposure level by outputting a control signal for increasing the gain, a control signal for increasing the exposure time, and a control signal for opening the aperture 42 wider in order. S270 is an example of the first adjustment. Thereafter, the developing processor 46 may iterate the exposure control process for the cropped image TP.

Thus, because the developing processor 46 adjusts the exposure time, the aperture, and the gain by placing importance on the center portion where the speaker P0 is positioned in the cropped image TP rather than on a peripheral portion of the image, the developing processor 46 can adjust the image of the speaker P0 to optimum brightness.

Figure 8:
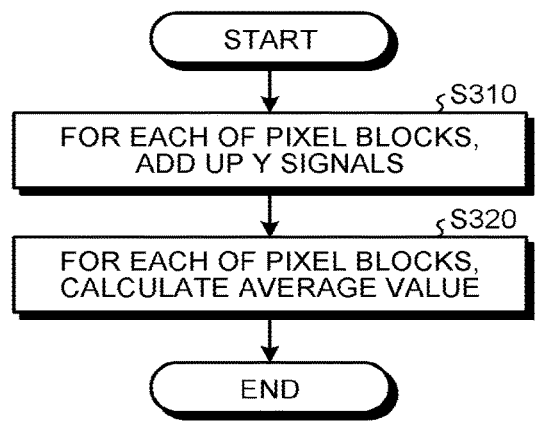
FIG. 8 is a flowchart of a process for calculating an evaluative metered value of a wide-angle image.
Figure 9:
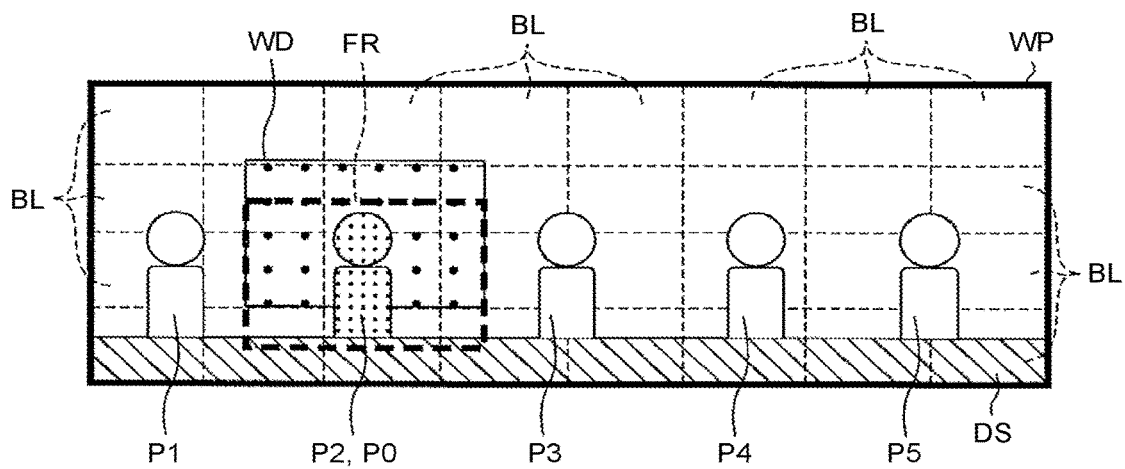
FIG. 9 is a diagram describing the wide-angle image.

FIG. 8 is a flowchart of a process for calculating an evaluative metered value of a wide-angle image WP. FIG. 9 is a diagram describing the wide-angle image WP.

Exposure of the wide-angle image WP illustrated in FIG. 9 is performed for the purpose of determining the position of the speaker P0 relative to the entire image and a condition of the wide-angle image WP in its entirety. Exposure of the wide-angle image WP is preferably performed using metering that makes the condition of the wide-angle image WP favorable in its entirety. Examples of such favorable metering for the wide-angle image WP include average metering that calculates an average value of Y signals (i.e., luminance values) of the entire wide-angle image WP as an evaluative metered value and histogram metering that obtains, as the evaluative metered value, a weighted average by calculating and dividing a histogram and assigning weights to the respective pixel blocks BL divided in accordance with the divided histogram. The process for calculating the evaluative metered value of the wide-angle image presented in the flowchart illustrated in FIG. 8 is described through an example of average metering.

As illustrated in FIG. 8, in the process for calculating the evaluative metered value of the wide-angle image WP, the developing processor 46 adds up Y signals, which are the luminance values, for each of the pixel blocks BL of the wide-angle image WP (S310).

The wide-angle image WP illustrated in FIG. 9 is an image of a wide-angle area (e.g., an area of 360 degrees) taken with the camera 20. The wide-angle image WP contains a plurality of participants P1, P2, P3, P4, and P5. The participant P2, one of the participants P1 to P4, is the speaker P0. The speaker P0 is in front of the window WD indicated as a dot-hatched area. The desk DS indicated as a diagonally-hatched area is arranged in front of the participants P1 to P4. The cropped image TP described above is the image inside a frame FR indicated by thick dashed lines.

The wide-angle image WP is divided into the 8×4 pixel blocks BL. In FIG. 9, each of the pixel blocks BL is surrounded with dashed lines. The pixel block BL contains, for example, 100×100 pixels. The developing processor 46 adds up Y signals of the 100×100 pixels of each of the pixel blocks BL.

The developing processor 46 calculates an average value of the Y signals of each of the pixel blocks BL as an evaluative metered value of the wide-angle image WP (S320). Specifically, the developing processor 46 calculates the average value of the Y signals by dividing a total value obtained by adding up the Y signals by the number of pixels in each of the pixel blocks BL. The evaluative metered value of the wide-angle image WP is an example of the characteristics of the wide-angle image WP. Here, a control process for calculating the evaluative metered value of the wide-angle image WP performed by the developing processor 46 is completed.

Figure 10:
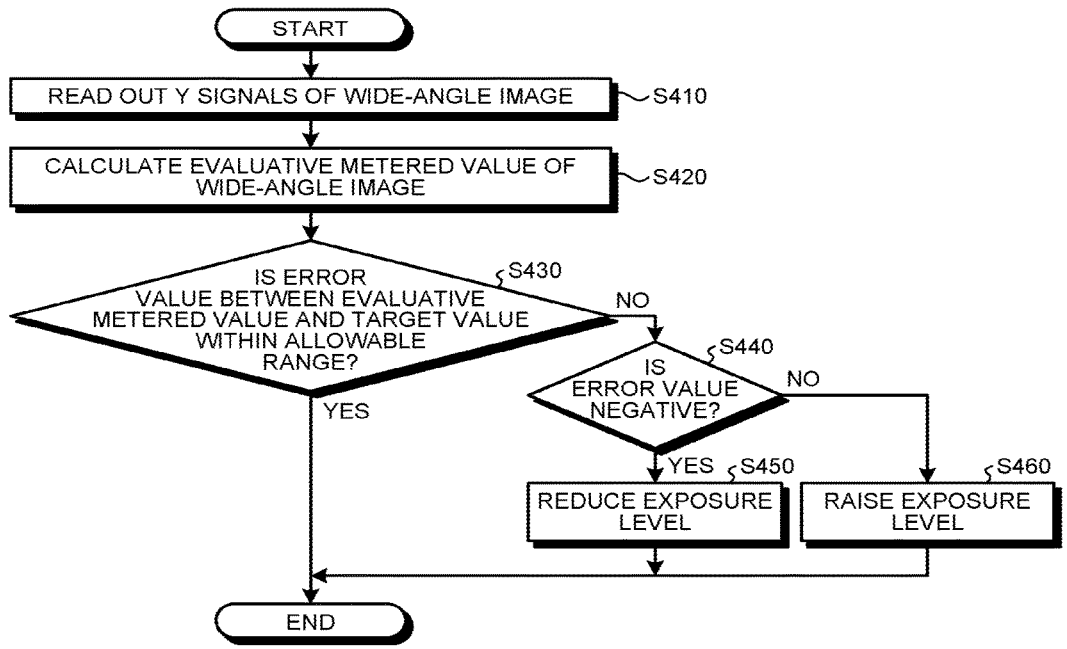
FIG. 10 is a flowchart of an exposure control process performed on the wide-angle image based on an evaluative metered value of the wide-angle image.

FIG. 10 is a flowchart of an exposure control process performed on the wide-angle image WP based on the evaluative metered value of the wide-angle image WP.

As illustrated in FIG. 10, in the exposure control process, the developing processor 46 reads out the Y signals of the wide-angle image WP from the memory 72 (S410). The developing processor 46 calculates an evaluative metered value of the wide-angle image WP in accordance with the above-described process for calculating the evaluative metered value of the wide-angle image WP (S420).

The developing processor 46 calculates an error value, which is the difference between the evaluative metered value of the wide-angle image WP and a predetermined target value, by making comparison between the evaluative metered value and the target value. As the target value, for example, an evaluative metered value at an optimum exposure level may be applied. The developing processor 46 determines whether or not the error value is within a predetermined allowable range (S430). In other words, the developing processor 46 determines whether or not exposure of the wide-angle image WP is within an appropriate range. For example, the developing processor 46 may determine whether or not the error value is within the allowable range by comparing the error value against a predetermined threshold value.

If it is determined that the error value is within the allowable range (Yes at S430), the exposure control process for the wide-angle image WP performed by the developing processor 46 is completed. Thereafter, the developing processor 46 may iterate the exposure control process for the wide-angle image WP.

If it is determined that the error value is not within the allowable range (No at S430), the developing processor 46 determines whether or not the error value is negative (S440). In other words, the developing processor 46 determines whether or not the wide-angle image WP is in underexposure or overexposure.

If it is determined that the error value is negative (Yes at S440), because it is indicated the wide-angle image WP is in overexposure, the developing processor 46 reduces the exposure level (S450). For example, the developing processor 46 reduces the exposure level by outputting a control signal for darkening contrast and a control signal for setting a gamma correction value to a value smaller than 1. S450 is an example of the second adjustment. Thereafter, the developing processor 46 may iterate the exposure control process for the wide-angle image WP.

If it is determined that the error value is not negative (No at S440), because it is indicated that the wide-angle image WP is in underexposure, the developing processor 46 raises the exposure level (S460). For example, the developing processor 46 raises the exposure level by outputting a control signal for brightening contrast and a control signal for setting the gamma correction value to a value larger than 1. S460 is an example of the second adjustment. Thereafter, the developing processor 46 may iterate the exposure control process for the wide-angle image WP.

Figure 11:
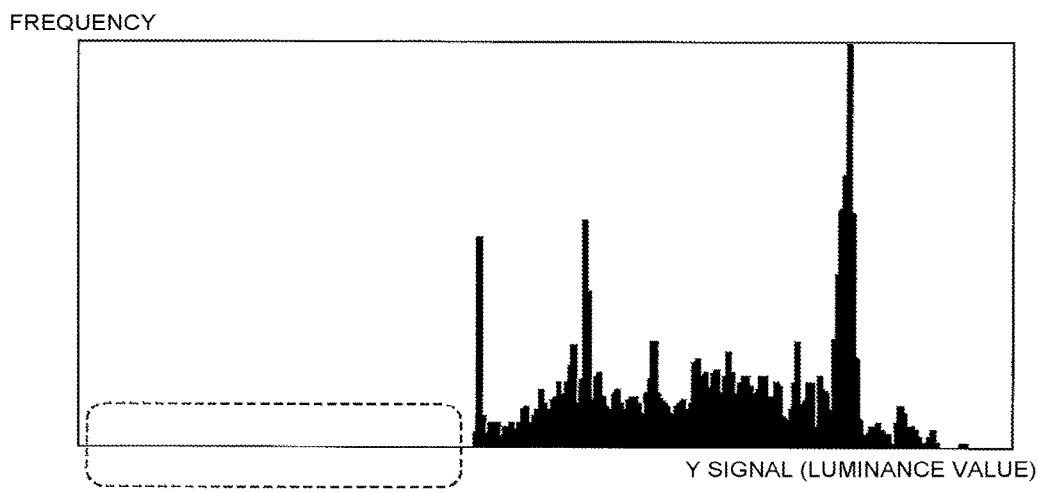
FIG. 11 is a histogram describing an example of exposure control for the wide-angle image.
Figure 12:
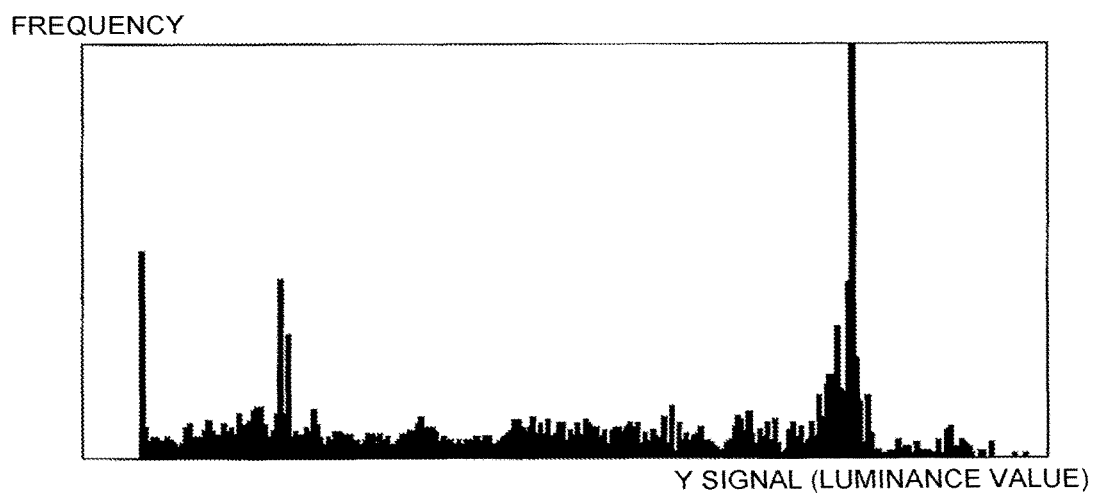
FIG. 12 is a histogram stretched to a region where Y signals (luminance values) are low in the exposure control for the wide-angle image.

FIG. 11 is a histogram describing an example of exposure control for the wide-angle image WP. FIG. 12 is a histogram stretched to a region where Y signals (luminance values) are low in the exposure control for the wide-angle image WP.

When the exposure control illustrated in FIG. 4 and FIG. 7 is applied to an image taken in such a condition where the speaker P0 is backlit as illustrated in FIG. 5, because exposure settings are adjusted suitable for the speaker P0 that is dark, the other areas of the image than the speaker P0 are adjusted to be too bright. In this case, as illustrated in FIG. 11, frequencies in a region (region encircled with a dashed line) where Y signals (luminance values) are low are small and frequencies concentrate to a region where Y signals are high. By stretching the histogram illustrated in FIG. 11 to the region where the Y signals are low, such a histogram as illustrated in FIG. 12 where frequencies are distributed also to the region where the Y signals are low can be obtained. By applying exposure control to the wide-angle image WP based on this histogram, the wide-angle image WP with appropriate exposure can be generated. Example methods for stretching the histogram include contrast adjustment, gamma correction, and bit shift.

Figure 13:
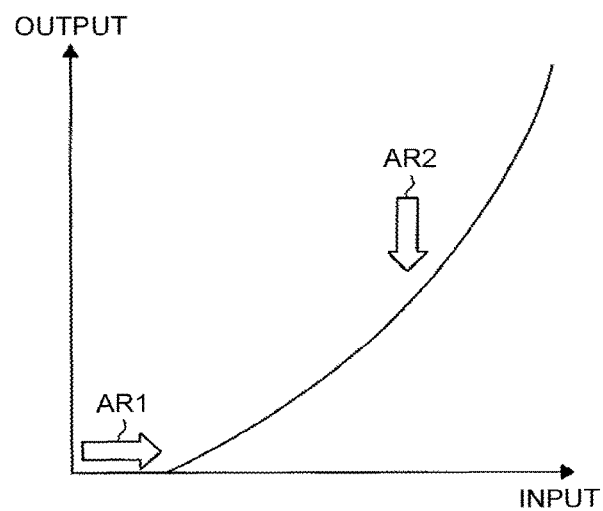
FIG. 13 is a diagram describing an example of a method for stretching the histogram.

FIG. 13 is a diagram describing an example of the method for stretching the histogram. For example, as illustrated in FIG. 13, the histogram can be stretched to the region where the Y signals are low by pulling the curve illustrated in FIG. 13 to a region where contrast is dark as indicated by arrow AR1 and deforming the curve so as to reduce a gamma correction value to a value smaller than 1 as indicated by arrow AR2. As a result, appropriate exposure can be achieved also in the wide-angle image WP.

Functions, linkages, and the like of or between elements of the above-described embodiment can be modified as appropriate.

In the above description, the video delivery system 10 according to the embodiment is applied to a video conferencing system. Alternatively, the embodiment may be applied to other video delivery systems including remote monitoring systems.

A video delivery system according to an aspect of the present invention is advantageously capable of displaying a cropped image with appropriate settings.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A video delivery terminal comprising:
an image capturer configured to perform image capture to generate an image of a subject; and
a developing processor configured to
crop an area of a portion of the image to generate a cropped image,
perform first adjustment regarding the cropped image based on characteristics of the cropped image, and
perform second adjustment regarding the image including the cropped image having undergone the first adjustment, wherein
the first adjustment includes adjusting at least one of exposure time and an aperture of the image capturer.

2. A video delivery terminal comprising:
an image capturer configured to perform image capture to generate an image of a subject; and
a developing processor configured to
crop an area of a portion of the image to generate a cropped image,
perform first adjustment regarding the cropped image based on characteristics of the cropped image, and
perform second adjustment regarding the image including the cropped image having undergone the first adjustment, wherein
the first adjustment and the second adjustment include at least one of gain adjustment, gamma correction adjustment, and contrast adjustment.

3. A video delivery terminal comprising:
an image capturer configured to perform image capture to generate an image of a subject; and
a developing processor configured to
crop an area of a portion of the image to generate a cropped image,
perform first adjustment regarding the cropped image based on characteristics of the cropped image, and
perform second adjustment regarding the image including the cropped image having undergone the first adjustment, wherein
the first adjustment and the second adjustment include white balance adjustment.

4. The video delivery terminal according to claim 1, wherein
the second adjustment is performed on settings different from settings of the first adjustment.

5. A non-transitory computer-readable medium comprising computer readable program codes, performed by a processor, the program codes when executed causing the processor to execute:
performing image capture to generate an image of a subject;
cropping an area of a portion of the image to generate a cropped image;
performing first adjustment regarding the cropped image based on characteristics of the cropped image; and
performing second adjustment regarding the image including the cropped image having undergone the first adjustment, wherein
the first adjustment includes adjusting at least one of exposure time and an aperture of the image capturer.

6. A video delivery method comprising:
performing image capture to generate an image of a subject;
cropping an area of a portion of the image to generate a cropped image;
performing first adjustment regarding the cropped image based on characteristics of the cropped image; and
performing second adjustment regarding the image including the cropped image having undergone the first adjustment, wherein
the first adjustment includes adjusting at least one of exposure time and an aperture of the image capturer.

7. A non-transitory computer-readable medium comprising computer readable program codes, performed by a processor, the program codes when executed causing the processor to execute:
performing image capture to generate an image of a subject;

cropping an area of a portion of the image to generate a cropped image;

performing first adjustment regarding the cropped image based on characteristics of the cropped image; and performing second adjustment regarding the image including the cropped image having undergone the first adjustment, wherein the first adjustment and the second adjustment include at least one of gain adjustment, gamma correction adjustment, and contrast adjustment.

8. A non-transitory computer-readable medium comprising computer readable program codes, performed by a processor, the program codes when executed causing the processor to execute:

performing image capture to generate an image of a subject;

cropping an area of a portion of the image to generate a cropped image;

performing first adjustment regarding the cropped image based on characteristics of the cropped image; and performing second adjustment regarding the image including the cropped image having undergone the first adjustment, wherein the first adjustment and the second adjustment include white balance adjustment.

9. A video delivery method comprising:

performing image capture to generate an image of a subject;

cropping an area of a portion of the image to generate a cropped image;

performing first adjustment regarding the cropped image based on characteristics of the cropped image; and performing second adjustment regarding the image including the cropped image having undergone the first adjustment, wherein the first adjustment and the second adjustment include at least one of gain adjustment, gamma correction adjustment, and contrast adjustment.

10. A video delivery method comprising:

performing image capture to generate an image of a subject;

cropping an area of a portion of the image to generate a cropped image;

performing first adjustment regarding the cropped image based on characteristics of the cropped image; and performing second adjustment regarding the image including the cropped image having undergone the first adjustment, wherein the first adjustment and the second adjustment include white balance adjustment.

* * * * *